Patented May 4, 1926.

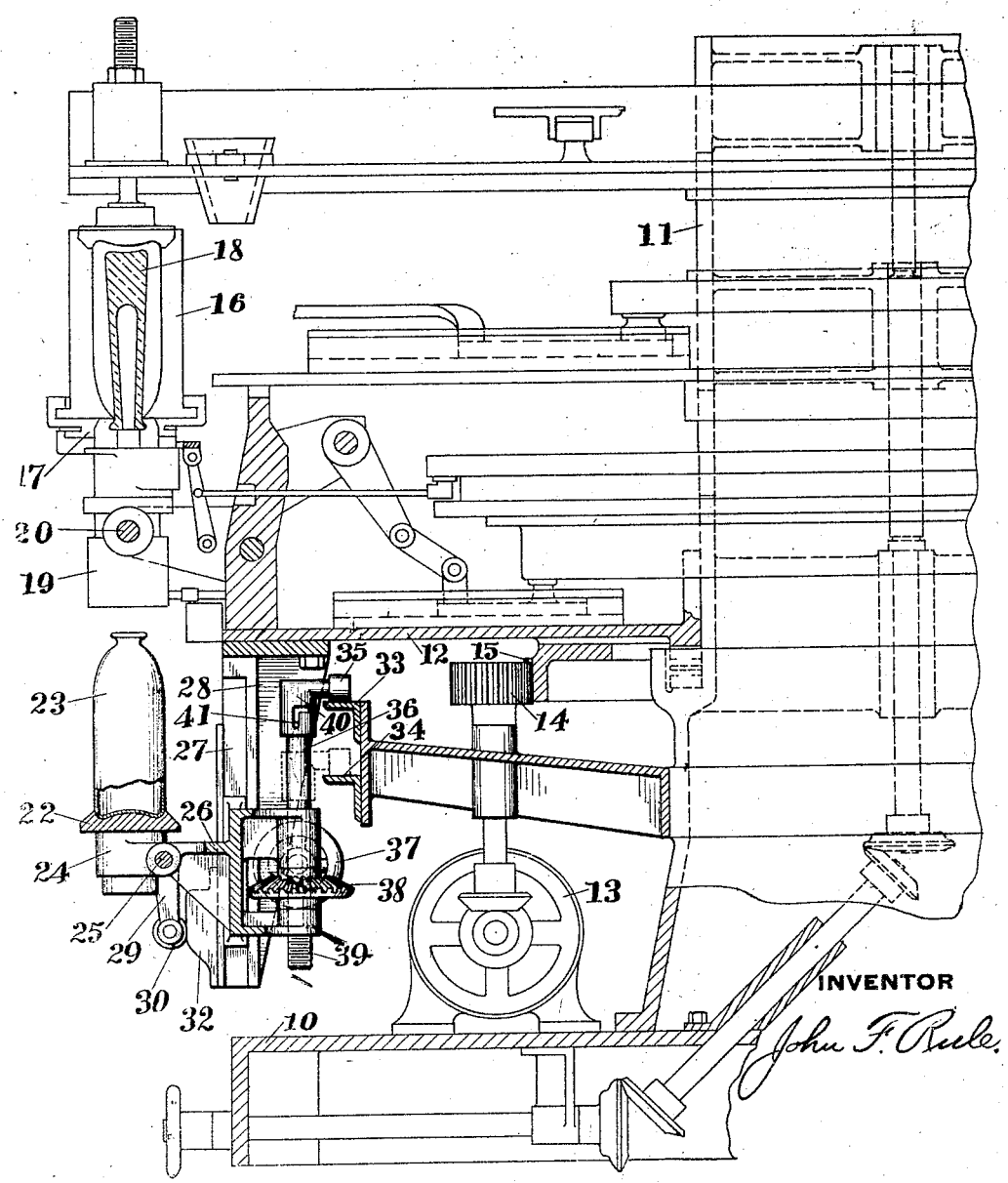
FIG-1-

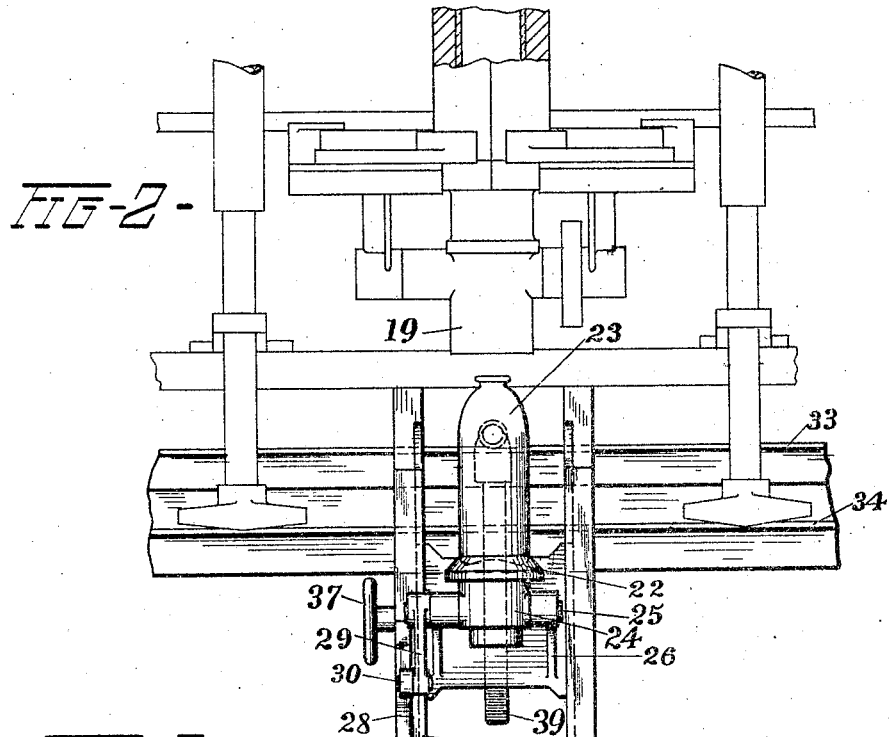
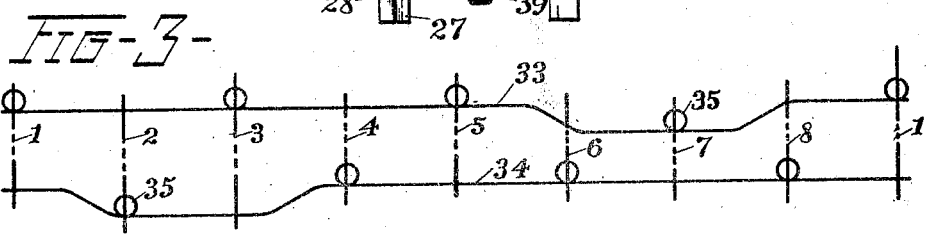
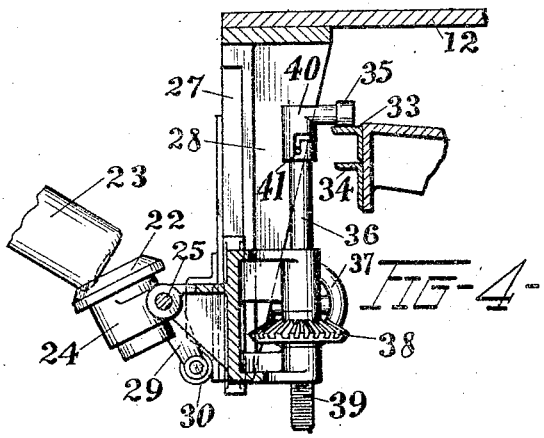

1,583,424

UNITED STATES PATENT OFFICE.

JOHN F. RULE, OF TOLEDO, OHIO, ASSIGNOR TO THE OWENS BOTTLE COMPANY, OF TOLEDO, OHIO, A CORPORATION OF OHIO.

GLASS-FORMING MACHINE.

Application filed September 29, 1922. Serial No. 591,238.

*To all whom it may concern:*

Be it known that I, JOHN F. RULE, a citizen of the United States, residing at Toledo, in the county of Lucas and State of Ohio, have invented new and useful Improvements in Glass-Forming Machines, of which the following is a specification.

My invention relates to machines for forming glass articles and particularly to means for discharging the articles from the machine at different positions. It is customary in machines of this character to provide on a rotating mold carriage, a series of molds from which the glass articles are successively discharged, all at the same position.

An object of my invention is to provide means for selectively discharging the articles at a plurality of different discharging stations/or positions. Various advantages are obtained from such a provision. In machines having a large output, the bottles or other articles are sometimes delivered more rapidly than they can be properly handled by the conveyors, setting-up apparatus or other automatic equipment ordinarily provided for handling the articles as they are discharged from the forming machine. The present invention provides means by which the forming machine distributes and delivers the articles to a plurality of such conveyors or other mechanisms.

It is also sometimes desirable where a plurality of different shapes or sizes of bottles or other articles are being simultaneously produced on the same machine, to deliver said articles to a corresponding number of conveyors. It is also sometimes desirable to selectively convey such articles to different leers. These and other objects, as will appear hereinafter, are attained by the use of my invention.

In the accompanying drawings:

Figure 1 is a part sectional side elevation of a portion of a bottle blowing machine, to which the present invention is applied.

Figure 2 is a front elevation of parts shown in Figure 1.

Figure 3 illustrates diagrammatically the development of cams controlling the selective discharge of the bottles.

Figure 4 is a fragmentary sectional view showing a mold bottom and its operating mechanism in the act of discharging a bottle.

The invention is herein shown applied to a machine of the type shown in the co-pending application of Leonard D. Soubier, Serial Number 564,183, filed May 27, 1922, although the invention is not limited to any particular construction or type of machine.

The machine comprises a base 10 on which is supported a stationary central column 11 around which rotates a mold carriage 12. The latter is driven continuously by a motor 13 connected thereto through gearing comprising a pinion 14 running in mesh with a ring gear 15 on the mold carriage.

Arranged around the carriage are a plurality of mechanisms or units each comprising a finishing mold 16, a neck mold 17, a blank mold (not shown) and mechanisms for actuating the molds and for blowing the glass therein. After the parison of glass 18 which has been formed in the blank mold, is blown in the finishing mold, a head 19 carrying the neck mold and finishing mold is rotated about a horizontal pivot 20 to swing the finishing mold with the blown article therein downward from an inverted to an upright position. A mold bottom or support 22 is then brought up in register with the finishing mold and the latter opened, leaving the finished bottle 23 supported on said bottom. The mold bottom is removably mounted in a sleeve 24 carried on a horizontal fulcrum pin 25 journalled in a supporting head or frame 26. Said head is slidable vertically in guideways 27 formed in guide posts 28 secured to the carriage 12. Fixed to the fulcrum pin 25 is an arm 29 carrying a cam roll 30 bearing on a cam 32 on one of the guide posts 28. Said cam is so shaped that as the mold bottom is lowered from the Figure 1 position, the arm 29 is permitted to swing inward to the Figure 4 position, thereby tilting the mold bottom 22 and discharging the bottle.

The up and down movements of the heads 26 are controlled by a plurality of stationary cams 33 and 34 on which run rolls 35, mounted on elbows 40, carried by vertical stems or rods 36 supported in the heads 26. Each rod 36 comprises a screw threaded portion 39 on which is threaded a pinion 38 operated by a hand wheel 37 and intermediate gearing to adjust the head 26 up and down on the rod 36. In this manner, the mold bottom 22 may be adjusted to molds of different lengths. Each mold bottom may be placed under the control of either cam track 33 or 34. A bayonet slot and pin connection 41 between the elbow 40 and stem 36 provides a convenient means for swinging the elbow clear of the cams for shifting the control from one cam to another.

The cam track 33 controls the up and down movements of certain of the heads 26, thereby controlling the tilting of certain of the mold bottoms, while others are independently controlled by the cam track 34. Thus, the positions at which the bottles are discharged are selectively controlled by these cams. Referring to Figure 3, which illustrates diagrammatically a development of the cams 33 and 34, successive positions of the rolls 35 during a complete rotation of the mold carriage, are indicated by the broken lines 1 to 8 inclusive. It will be noted that at the position 2, a roll 35 on the lower cam 34 has just moved onto the low portion of its cam, thereby tilting the corresponding mold bottom for discharging a bottle at this point. At the position 7, a roll 35 is on the low portion of the upper cam 33, so that the corresponding mold bottom at this position has been tilted to discharge its bottle. The low portions of the cams, as shown, are at opposite sides of the machine and control alternate molds so that alternate bottles are discharged at opposite sides of the machine. It will be understood that the relative position of the low points on the two cams can be varied to any extent desired, so that the position of discharge for bottles controlled by one cam may be at any desired distance in advance of the discharge position for the bottles controlled by the other cam. It will also be understood that although in the particular arrangement shown on the diagram (Fig. 3), alternate bottles are controlled by each cam, the number of bottles controlled by either cam can be varied. Also, the number of cams can be increased, if desired.

Modifications may be resorted to within the spirit and scope of my invention.

What I claim is:

1. In a glass forming machine, the combination of a series of molds, means for bringing them singly in succession to the same charging position for receiving their charges of glass in succession at said position, means for manipulating each charge of glass by a series of operations to produce an article of finished form, the operations on the several articles being effected in succession, each operation taking place on a charge of glass while in the same position as the preceding charge when the corresponding operation took place thereon, and selective means controlling the discharge of the articles and determining their discharging positions, said selective means comprising a plurality of devices cooperating with the molds for discharging the articles at a plurality of different positions, each of said selective devices being operable automatically to cause certain of said articles to be discharged at a predetermined one of said positions different from the discharging position of the articles under the control of the other selective means.

2. In a glass forming machine, the combination of a mold carriage, molds thereon, means to rotate the carriage and bring the molds singly and in succession to the same charging position, and means to discharge articles from the molds at a plurality of different positions, said discharging means comprising a plurality of devices each operable to cause the discharge of certain of the articles at a position different from that at which any of the articles under the control of the other discharging means are discharged.

3. In a glass forming machine, the combination of a rotary mold carriage, an annular series of molds thereon, devices individual to the molds and cooperating therewith for forming articles in the molds, all of said devices being brought in succession to the same operating position for performing their functions, and a plurality of controlling devices each operable to cause the discharge from the machine, of the articles from predetermined selected molds of the series at a predetermined position different from the position at which any of the articles from the other molds are discharged.

4. In a glass forming machine, the combination of a rotary mold carriage, an annular series of molds thereon travelling in the same path, means cooperating with the molds for forming articles therein during said travel, all of the molds traversing the same portion of said path during the formation of the articles, and a plurality of controlling devices operable to control the discharge from the machine of articles formed in selected molds, each of said controlling devices operable to effect the discharge of articles under its control at the same predetermined position separate from the position of discharge of the articles controlled by any other said device.

5. In a glass forming machine, the combination of a rotary mold carriage, an annular series of molds thereon, tiltable mold bottoms on which articles which have been formed in the molds are supported, and means for controlling the tilting of predetermined ones of said bottoms, and other means for separately controlling the tilting of others of said bottoms.

6. In a glass forming machine, the combination of a rotary mold carriage, an annular series of molds thereon, tiltable mold bottoms on which articles which have been formed in the molds are supported, and a plurality of controlling devices each operable to effect the tilting of certain of said mold bottoms independently of the others, and at a different position from that at which the others are tilted.

7. In a glass forming machine, the combination of a rotary mold carriage, an annular series of molds thereon, tiltable mold bottoms on which articles which have been formed in the molds are supported, and a plurality of controlling devices each controlling the tilting of certain mold bottoms, each said device operable to tilt all the mold bottoms under its control at the same point in their rotation with the mold carriage, and each controlling device operating to tilt its mold bottoms at a different position.

8. In a glass forming machine, the combination of a rotary mold carriage, an annular series of molds thereon, a plurality of controlling devices each operable to control the discharge of articles formed in certain of the molds, the discharge from each mold being under the control of only one of said controlling devices, and means whereby the control of articles from any mold may be shifted from one to another of said controlling devices.

9. In a glass forming machine, the combination of a rotating mold carriage, molds thereon, mechanisms associated with the individual molds for effecting the discharge from the machine at different discharging positions, of articles formed in said molds, and cams individual to said positions and each controlling the operations of certain of said mechanisms.

10. In a glass forming machine, the combination of a rotating mold carriage, molds thereon, mechanisms associated with the individual molds for effecting the discharge from the machine of articles formed in said molds, and a plurality of cams separately controlling the operations of said mechanisms, each of said cams arranged to effect the discharge of the articles controlled thereby at a predetermined position during the rotation of the carriage different from any position at which articles controlled by any other said controlling device are discharged.

11. In a glass forming machine, the combination of a mold carriage, molds thereon, mechanisms ansociated with the individual molds for effecting the discharge from the machine of articles formed in said molds, and a plurality of cams controlling the operations of said mechanisms, each of said mechanisms being adapted to be placed under the control of either controlling cam.

12. In a glass forming machine, the combination of a rotary mold carriage, molds thereon, a mold bottom associated with each mold, heads on which the mold bottoms are mounted, and stationary cam tracks each controlling certain of said heads and operable as each head reaches a predetermined point in its rotation with the mold carriage, to lower said head and tilt the mold bottom, each cam track operable to effect the tilting of the mold bottoms under its control independently of the other cam tracks and at a different rotative position of the molds.

13. In a glass forming machine, the combination of a rotatable mold carriage, an annular series of molds thereon, tiltable mold bottoms on which articles which have been formed in the molds are supported, controlling devices which control the tilting of certain of said mold bottoms independently of the others, and adjusting means by which an operator may selectively place the mold bottoms under the control of either of said controlling devices.

14. In a glass forming machine, the combination of a rotatable mold carriage, molds thereon, mechanisms associated with the individual molds for effecting the discharge from the machine at different discharging positions, of articles formed in said molds, cams controlling the operations of said mechanisms, and adjusting means by which an operator may selectively shift the control of said mechanisms from one cam to another.

Signed at Toledo, in the county of Lucas and State of Ohio, this 15th day of September, 1922.

JOHN F. RULE.